US012181066B2

(12) United States Patent  
Boyd et al.

(10) Patent No.: US 12,181,066 B2  
(45) Date of Patent: Dec. 31, 2024

(54) SEAT POCKET INSERT (71) Applicant: FMC Technologies, Inc., Houston, TX (US)

(72) Inventors: Gareth Boyd, Houston, TX (US); Bruno Freitas, Houston, TX (US); Christopher Adams-Hernandez, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 117 days.

(21) Appl. No.: 17/603,290

(22) PCT Filed: Apr. 14, 2020

(86) PCT No.: PCT/US2020/028096  
§ 371 (c)(1),  
(2) Date: Oct. 12, 2021

(87) PCT Pub. No.: WO2020/214578  
PCT Pub. Date: Oct. 22, 2020

(65) Prior Publication Data  
US 2022/0221064 A1  Jul. 14, 2022

Related U.S. Application Data

(60) Provisional application No. 62/834,213, filed on Apr. 15, 2019.

(51) Int. Cl.  
*F16K 3/02* (2006.01)  
*E21B 34/02* (2006.01)

(52) U.S. Cl.  
CPC ............ *F16K 3/0236* (2013.01); *E21B 34/02* (2013.01); *F16K 3/0272* (2013.01)

(58) Field of Classification Search  
CPC ....... F16K 3/0236; F16K 3/0272; E21B 34/02  
(Continued)

(56) References Cited

U.S. PATENT DOCUMENTS 3,217,739 A * 11/1965 La Valley ............. F16K 27/044  
251/329  
4,124,194 A   11/1978 Alvarez et al.  
(Continued)

FOREIGN PATENT DOCUMENTS

CA     2585321 C     6/2011  
EP     0045141 A1    2/1982  
(Continued)

OTHER PUBLICATIONS

International Search Report issued in Application No. PCT/US2020/028096, mailed on Jul. 20, 2020 (4 pages).  
(Continued)

*Primary Examiner* — John Bastianelli  
(74) *Attorney, Agent, or Firm* — Osha Bergman Watanabe & Burton LLP (57) ABSTRACT

A seat pocket insert for a valve block may include an insert body extending, in an axial length, between a first end surface and a second end surface. Additionally, the second end surface may have a profile configured to sealingly engage with a seat of a valve. Further, a bore may be provided axially extending through the first end surface to the second end surface of the insert body.

24 Claims, 5 Drawing Sheets

(58) Field of Classification Search
USPC .................................. 251/326–329, 360–363
See application file for complete search history.

(56) References Cited

U.S. PATENT DOCUMENTS

| | | | |
|---|---|---|---|
| 4,136,710 A | 1/1979 | Bond | |
| 4,313,458 A | 2/1982 | Burns et al. | |
| 4,513,947 A | 4/1985 | Amend | |
| 4,519,582 A | 5/1985 | Freeman | |
| 4,562,888 A | 1/1986 | Collet | |
| 6,669,171 B1* | 12/2003 | Stunkard | F16K 5/0673 251/315.08 |
| 6,966,537 B2* | 11/2005 | Sundararajan | F16K 3/0227 251/175 |
| 7,950,410 B2* | 5/2011 | McGuire | F16K 3/0236 251/327 |
| 8,973,897 B2* | 3/2015 | Cordova | F16K 3/02 251/327 |
| 9,453,578 B2 | 9/2016 | Sundararajan | |
| 2003/0015681 A1 | 1/2003 | Chatufale | |
| 2008/0164437 A1 | 7/2008 | Lam et al. | |
| 2009/0095934 A1 | 4/2009 | Cain et al. | |
| 2015/0014568 A1 | 1/2015 | Sundararajan | |
| 2017/0241552 A1 | 8/2017 | Roberts | |
| 2018/0266570 A1 | 9/2018 | Linder | |
| 2018/0266573 A1 | 9/2018 | Nowell et al. | |
| 2019/0264818 A1 | 8/2019 | Powell et al. | |

FOREIGN PATENT DOCUMENTS

| | | |
|---|---|---|
| EP | 0447707 A1 | 9/1991 |
| EP | 2976559 A1 | 1/2016 |
| WO | 2018-096428 A1 | 5/2018 |

OTHER PUBLICATIONS

Written Opinion issued in Application No. PCT/US2020/028096, mailed on Jul. 20, 2020 (6 pages).

* cited by examiner

SEAT POCKET INSERT

FIELD OF DISCLOSURE

Embodiments disclosed herein relate generally to oil and gas production equipment. More particularly, embodiments disclosed herein relate to a seat pocket insert for use on a valve block.

BACKGROUND

Oil and gas equipment may be used for many different applications. One particular application includes hydrocarbon production from a land or subsea well, which involves extracting or removing hydrocarbon fluid from a formation below a ground surface or the surface of the seafloor. In systems, such as hydrocarbon production systems, water injection systems, or frac systems, a variety of flow control devices are used to control a flow rate, a pressure, and other parameters of a fluid flow. These flow control devices may include valves, pressure regulators, meters and gauges, and chokes. In addition, the flow control devices may be in a valve block, tree, or wellhead, which is a complex configuration of actuable valves, flow bores, and other components. The valve block, tree, or wellhead may be used onshore or offshore. The primary function of the valve blocks, trees, or wellheads is to control the flow of fluids into and out of a well, depending on whether it is an injection well or a production well. However, valve blocks, trees, or wellheads can also include other functionality to allow for troubleshooting, well servicing, etc. Because various operations may be performed at the well, the arrangement of components may be modified to accommodate different operations, pressures, and implementations. For example, valves may be installed in the valve blocks, trees, or wellheads to isolate bores and outlets from pressures that may be higher than pressure-ratings for the wellhead's flange connections or to direct/restrict flow.

In conventional methods, valves typically have a floating seat that is not rigidly held in place and the seat is captured within the seat pocket that has traditionally been a feature machined into the valve block. An external pressure source, such as a pressure obtained by a gate floating, is applied to the seat to urge or bias the seat outwardly into engagement with the valve to provide a fluid-tight engagement in the seat pocket. However, due to flow through the bore of the valve block, the potential for wear around the seat pocket machined in the valve block increases. With the seat pocket machined into the valve block, the valve block requires longer manufacturing and repair times with less versatility repairs as costs are increased and require further downtime to repair the valve block.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a seat pocket insert for a valve block that may include an insert body extending, in an axial length, between a first end surface and a second end surface. Additionally, the second end surface may have a profile configured to sealingly engage with a seat of a valve. Further, a bore may be provided axially extending through the first end surface to the second end surface of the insert body In another aspect, embodiments herein relate to a valve block that may have a body having one or more flow bores and at least one seat having a bore disposed within the one or more flow bores. In addition, at least one seat pocket insert may be inserted to an outlet or an inlet of the one or more flow bores. The at least one seat pocket insert may include an insert body extending, in an axial length, between a first end surface and a second end surface. Additionally, the second end surface may have a profile configured to sealingly engage with a seat of a valve. Further, a bore may be provided axially extending through the first end surface to the second end surface of the insert body. Furthermore, a portion of at least one the seat may be sealingly engaged in the profile of the at least one seat pocket insert.

In yet another aspect, embodiments herein relate to a method for sealing a seat within a valve block that may include disposing a first seat in a flow bore of the valve block; inserting a first seat pocket insert into an outlet or an inlet of the flow bore; and sealingly engaging the first seat against a profile of the first seat pocket insert via a pressure from a valve.

Other aspects and advantages will be apparent from the following description and the appended claims.

DETAILED DESCRIPTION

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a tree or valve block reference to a block with at least one bore that that control and regulate the flow of fluids for purposes of either injecting fluid (i.e. frac fluid) into an injection well or recovering hydrocarbons (i.e. reservoir fluid) from a production well. In addition, any terms designating tree or valve block (i.e., any wellheads or frac valves) at a rig type (i.e., any land rig or offshore rig) should not be deemed to limit the scope of the disclosure. As used herein, fluids may refer to slurries, liquids, gases, and/or mixtures thereof. It is to be further understood that the various embodiments described herein may be used in various stages of a well, such as rig site preparation, drilling, completion, abandonment etc., and in other environments, such as work-over rigs, fracking installation, well-testing installation, oil and gas production installation, without departing from the scope of the present disclosure. It is recognized by the different embodiments described herein that a tree or valve block plays a valuable and useful role in the life of a well. Further, it is recognized that the fluid flow configuration and arrangement of components for a tree or valve block according to one or more embodiments described herein may provide a cost effective alternative to conventional trees or valve block. The embodiments are described merely as examples of useful applications, which are not limited to any specific details of the embodiments herein.

In one aspect, embodiments disclosed herein relate to a seat pocket insert, such as may be used in a seat pocket and/or flow bore, for example. A seat pocket insert may also be interchangeably referred to as an insert in the present disclosure. As used herein, the term "coupled" or "coupled to" or "connected" or "connected to" "attached" or "attached to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

According to embodiments of the present disclosure, seat pocket inserts are apparatuses that may be used as a seat pocket and/or a flow bore to hold a seat in one or more flow bores of a valve block, in fluid communication with a well, and be coupled to a body of the valve block. In one or more embodiments, the seat pocket insert may include an insert body axially extending from a first end surface to a second end surface and having a bore axially extending through the first end surface to the second end surface. The insert body is inserted is in a flow passage or cavity of at least one flow bore to be a seat pocket for a seat within the one or more flow bores. Additionally, the flow passage or cavity may be at an inlet or outlet. Depending on size, pressure rating and style, a seal (e.g., elastomer or metal) may be included to sealingly attach to a seat to the seat pocket insert. The seat may abut against a cut-out of the seat pocket insert such that a profile of the cut-out is a seat pocket. Further, a connection or contact surface of the seat pocket insert is connected to a connection or contact surface of the valve block to lock the seat pocket insert within the one or more flow bores at an outlet or inlet. For example, the connection surfaces of the seat pocket insert and the valve block may have threads that may be any type of threads, such as ACME threads, API threads, or specialty threads.

It is further envisioned that the connection surfaces may include any mechanical coupler device to couple the seat pocket insert and the valve block together without departing from the present scope of the disclosure. In a non-limiting example, the contact surface of the seat pocket insert may be solid to be flush against the contact surface of the valve block. In some embodiments, the contact surfaces of the seat pocket insert and the valve block may be machined to a tolerance such that said contact surfaces are flush against each other. Additionally, the seat pocket insert may be press fitted within the valve block and is retained in the block valve by flange coupled to the valve block. Threaded bolts of the flange may be threaded into the valve body and the flange abuts against the seat pocket insert to retain the seat pocket insert within the valve block.

Figure 1:
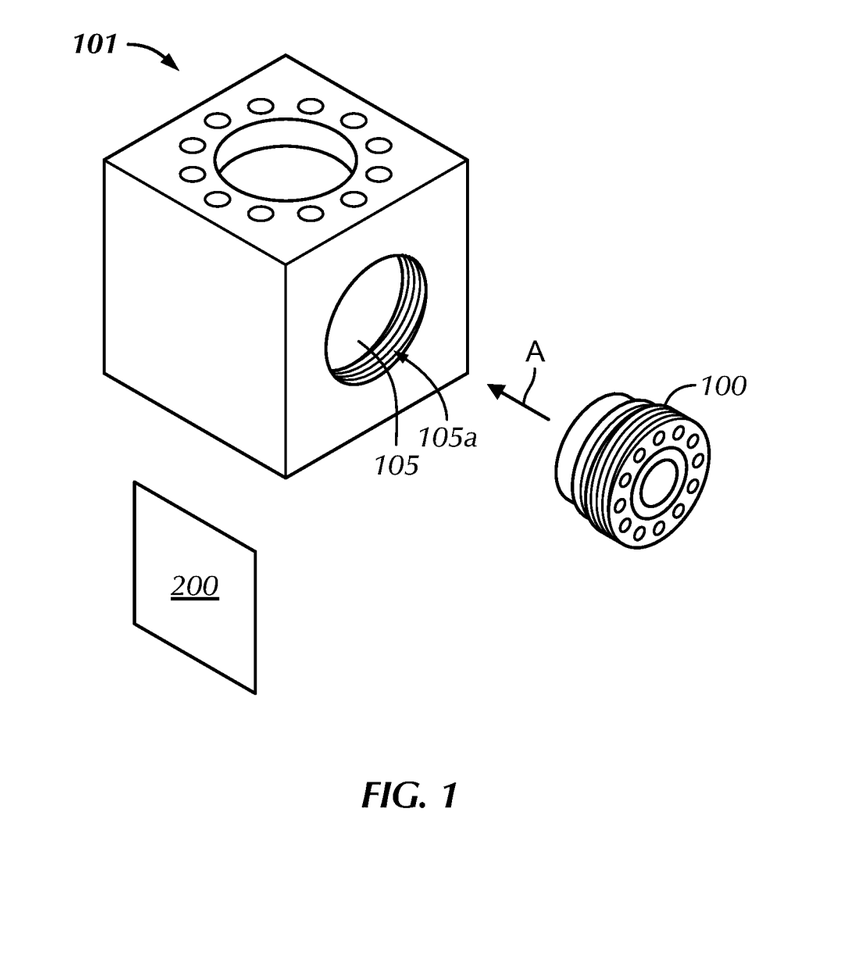
FIG. 1 is a perspective view of a seat pocket insert in accordance with one or more embodiments of the present disclosure.

Turning to FIG. 1, FIG. 1 shows a perspective view of a valve block 101 with one or more flow bores 105 located internally within the valve block 101 in accordance with one or more embodiments of the present disclosure. Additionally, a seat pocket insert 100 may be inserted (see arrow A) into an opening 105*a* of the one or more flow bores 105. FIG. 1 is a simplified elevation view and one of ordinary skill will understand that additional components may be added or used in conjunction with the valve block 101 shown in FIG. 1. In a non-limiting example, at least one generally cylindrical tubular may be disposed within the one or more flow bores 105. In one or more embodiments, the valve block 101 is coupled to a wellhead of a subsea well (not shown). Those of ordinary skill in the art will appreciate that there are many techniques and methods which may be used to valve block 101 to a subsea wellhead that may be applicable to the embodiments described herein, including, using a tree connector. In one or more embodiments, the valve block 101 is an assembly of one or more blocks, tubulars, valves, and other components that may be configured to operate in conjunction with a subsea well.

Figure 2:
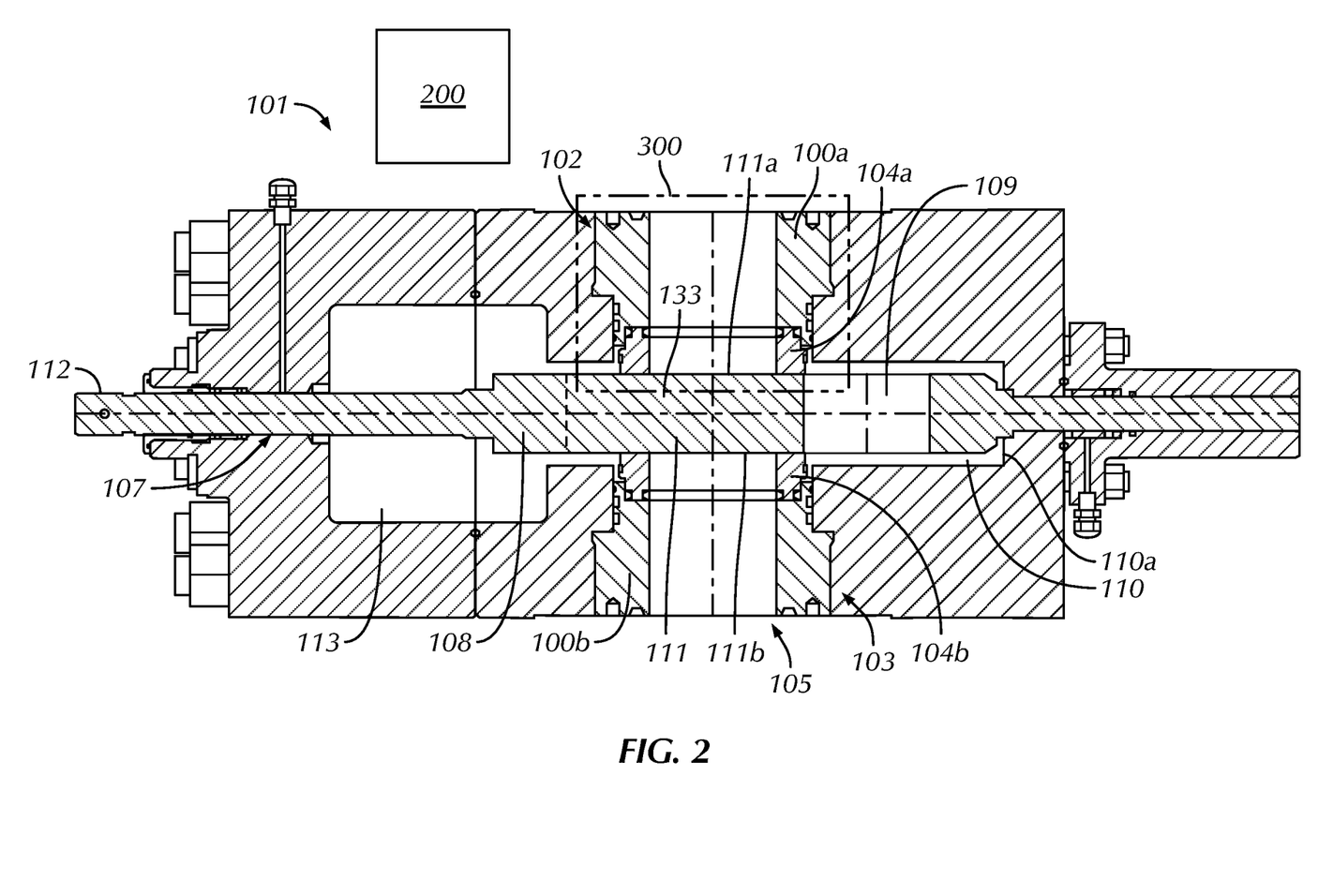
FIG. 2 is a cross-sectional view of a seat pocket insert taken along a plane of FIG. 1 in accordance with one or more embodiments of the present disclosure.

Now turning to FIG. 2, FIG. 2 shows a cross-sectional view of seat pocket inserts (100*a*, 100*b*) inserted within in the valve block 101 taken along plane 200 of FIG. 1 in accordance with one or more embodiments of the present disclosure. In a non-limiting example, a first seat pocket insert 100*a* may be inserted an inlet 102 and a second seat pocket insert 100*b* may be inserted into an outlet 103. Additionally, a first seat 104*a* may be disposed between the first seat pocket insert 100*a* and a top surface 111*a* of a valve body 111 of a valve 108. Further, a second seat 104*b* may be disposed between a second seat pocket insert 100*b* and a bottom surface 111*b* of the valve body 111 of the valve 108. One skilled in the art will appreciate how inserting the first seat pocket insert 100*a* and the second seat pocket insert 100*b* into the valve block 101, the first seat 104*a* and the second seat 104*b* may be sealingly held in place within the one or more flow bores 105 by a pressure from the valve body 111 abutting thereof. Furthermore, the first seat pocket insert 100*a*, the second seat pocket insert 100*b*, the first seat 104*a*, and the second seat 104*b* are coaxial with the one or more flow bores 105.

In one or more embodiments, the valve block 101, as shown in FIG. 2, may have a body 106 made of a metal block with the one or more flow bores 105. For Example, the valve block 101 may be a portion of a vertical or horizontal tree; such that the one or more flow bores 105 may be a vertical flow bore. In one or more embodiments, the valve block 101 is landed or located above a well, and the vertical flow bore 105 may be in fluid communication with a flow bore (not shown) of the well (not shown). Further, in one or more embodiments, the vertical flow bore 105 of subsea tree 102 may be concentric with the flow bore of a well. As will be recognized by those skilled in the art, the valve block 103 may take other forms or have other features. For example, subsea tree 102 may have a non-vertical, e.g. at least one horizontal flow bore 107 extending through the valve block 101 [103]. Further, the horizontal flow bore 107 may be perpendicular and in fluid communication with the vertical flow bore 105 such that the vertical flow bore 105 may be accessed through the horizontal flow bore 107. Thus, those of ordinary skill will appreciate that the present embodiments may be altered and are not limited to the illustrative configurations of the valve block 101 depicted in the attached drawings.

In some embodiments, a valve 108, such as a flow restrictor 133, may be installed in the valve block 101 through the horizontal flow bore 107. In a non-limiting example, the valve 108 may be any gate valve known in the art. As shown in FIG. 2, the valve 108 is illustrated in a closed position. In the closed position, a valve opening 109 of the valve 108 may be positioned in a valve cavity 110 such that the valve body 111 is abutting and pressuring the seats (104a, 104b) against the seat pocket inserts (100a, 100b) to close the vertical flow bore 105. Additionally, the valve body 111 may abut against an end 110 a of the valve cavity 110 to have the valve 108 in a fully closed position. It is further envisioned that to place the valve 108 in an open position, an extensions rod 112 engages the valve body 111 of the valve 108 and is actuated such that the valve body 111 is moved into a chamber 113 of the valve block 101. With the valve body 111 positioned in the chamber 113, the valve opening 109 may be positioned to open the vertical flow bore 105 for flow. Additionally, in the open position, the valve opening 109 is coaxial with the first seat 104a, the second seat 104b, the first seat pocket insert 100a, and the second seat pocket insert 100b. Further, in a non-limiting example, a wheel or actuating device (pneumatically, hydraulically, or mechanically) may be attached to the extensions rod 112 such that when the device is turned or actuated, the valve 108 is moved from the closed position to the open position or vice versa.

Figure 3:
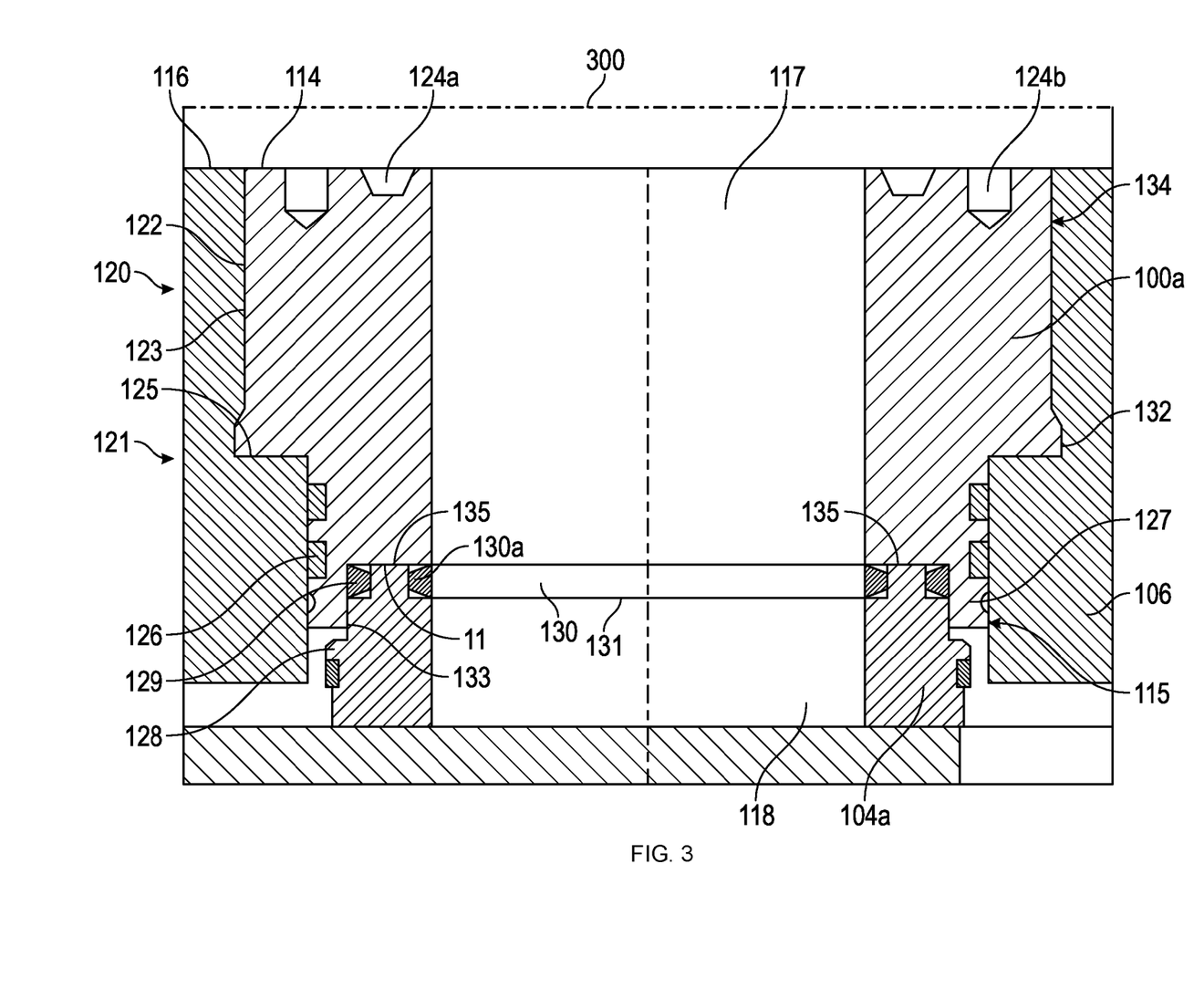
FIG. 3 is a blown-up view of the seat pocket insert from a square box in FIG. 2 in accordance with one or more embodiments of the present disclosure.

Referring to FIG. 3, in one or more embodiments, a close-up view of the valve block 101 taken from box 300 in FIG. 2 is illustrated. In box 300, the first seat pocket insert 100a is further shown. As discussed above, the first seat pocket insert 100a may be inserted into the inlet 102 of the vertical flow bore 105. Further, the inlet 102 may have a cavity or flow passage 134 for the first seat pocket insert 100a to be coupled into. In a non-limiting example, the first seat pocket insert 100a may be made of metal, such as steel, iron, treated iron, or any suitable metal alloy.

In one or more embodiments, the first seat pocket insert 100a may include an insert body extending, in an axial length, between a first end surface 114 and a second end surface 115. Additionally, when the first seat pocket insert 100a is fully inserted into the valve block (101), the first end surface 114 may be flush with an outer surface 116 of the body 106 of the valve block (101). The first seat pocket insert 100a may have a bore 117 axially extending through the first end surface 114 to the second end surface 115 of the insert body. Further, the first seat pocket insert 100a may have a first portion 120 near the first end surface 114 and a second portion 121 near the second end surface 115. In a non-limiting example, the first portion 120 may have a connection or contact surface 122 on an outer surface of the insert body. The connection or contact surface 122 may have threads which may engage threads of a connection or contact surface 123 within the body 106 of the valve block (101). For example, the connection or contact surface 123 may be provided on a portion (e.g., a flow passage or cavity) of the vertical flow bore (105) to lock/retain the first seat pocket insert 100a within the valve block 101. One skilled in the art will appreciate how the threads on the connection or contact surfaces 122, 123 may be any type of threads, such as ACME threads, API threads, or specialty threads. Further, the connection or contact surfaces 122, 123 may be provided with a stress relief feature 132. In some embodiments, the first end surface 114 may have at least one torque connection (124a, 124b), e.g., a hole or tab, which may be used to apply torque on the first seat pocket insert 100a. For example, a hammer or a wrench may be used to apply a force on a first torque connection 124a to rotate and torque the first seat pocket insert 100a. Additionally, a second torque connection 124b provided on the first end surface 114 may be used to connect the valve block (101) to any other subsea components. While it is noted that FIG. 3 shows four torque connections (124a, 124b) equally spaced apart, one of skill in the art would understand that this is merely a non-limiting example and any number of torque connections may be used without departing from the present scope of the disclosure.

While it is noted that FIG. 3 shows threads on the connection or contact surfaces 122, 123 to make-up the first seat pocket insert 100a to the valve block 101, one of skill in the art would understand that the use of threads is merely a non-limiting example and any suitable type of mechanical coupler may be used without departing from the present scope of the disclosure to couple the first seat pocket insert 100a to the valve block 101. In a non-limiting example, a groove may be provided on either or both the contact surfaces 122, 123 such that a ring may be placed in said groove to hold the first seat pocket insert 100a within the valve block.

Still referring to FIG. 3, in one or more embodiments, an outer diameter of the first portion 120 is larger than an outer diameter of the second portion 121 to form an outer load shoulder 125 of insert body. The outer load shoulder 125 may be used to abut the first seat pocket insert 100a against the body 106 of the valve block 101. While it is noted that FIG. 3 shows the outer load shoulder 125 at a ninety-degree angle from the first portion 120, one of skill in the art would understand that this is merely a non-limiting example and the outer load shoulder 125 may be any angle without departing from the present scope of the disclosure. Load shoulder 125 and or a positive stop (not shown) may be used to prevent over-tightening of the assembly, which may negatively impact operation of the valve 108. Additionally, the second portion 121 extends from the outer load shoulder 125. In some embodiments, the second portion 121 may include a plurality of seals 126 to seal an outer surface of the second portion 121 to the body 106 of the valve block (101). Additionally, the plurality of seals 126 may aid in preventing leaks between the first seat pocket insert 100a and the body 106 of the valve block (101). The plurality of seals 126 may be elastomeric, plastic, metallic, or a specialty seal.

In some embodiments, it is further envisioned that the second end surface 115 of the first seat pocket insert 100 a may be provided at the end of an axial protrusion 127 defining a profile 119 to receive and sealingly engage the first seat 104 a, where the profile may be defined by a protrusion inner surface 133 and a protrusion shoulder surface 135. The profile 119 may be machined to match a shape of the first seat 104 a, such that the profile 119 is a seat pocket for the first seat 104 a to abut against. As discussed above, the valve body 111 may be used to pressure the first seat 104 a such that the first seat 104 a is received into profile 119 and a protrusion 127 of the first seat pocket insert 100 a abut against a shoulder 128 of the first seat 104 a. One skilled in the art will appreciate how the protrusion 127 and the shoulder 128 may have opposite mating surfaces to be flush against each other. Further, elastomer or metal seal 129 may be provided between the first seat pocket insert 100 a and the first seat 104 a to seal an outer surface of the seat 104 with a surface of the profile 119. When the seat 104 abuts the first seat pocket insert 100 a, one skilled in the art will appreciate how the bore 117 of the first seat pocket insert 100 a may be coaxial with a bore 118 of the seat 104. It is further envisioned that an elastomeric seal 130 may be used to coaxially align the first seat pocket insert 100 a and the seat. In a non-limiting example, the elastomeric seal 130 may sit in a recess or groove 131 of the seat 104 to match the bore 118 of the seat 104 to the bore 117 of the first seat pocket insert 100 a. Further, the elastomeric seal 130 may have a spring 130 a thereof to attach the elastomeric seal 130 to the first seat 104 a. In addition, the bore 117 of the first seat pocket insert 100 a may have an inner diameter that is equal to an inner diameter of the bore 118 of the first seat 104 a.

While it is noted that the first seat pocket insert 100*a* is shown in FIG. 3, a configuration of the second seat pocket insert 100*b* and the second seat 104*b* may be identical to the configuration of the first seat pocket insert 100*a* and the first seat 104*a*. For simplicity purposes only the configuration of the first seat pocket insert 100*a* and the first seat 104*a* is described as the configuration of the second seat pocket insert 100*b* and the second seat 104*b* may be identical in configuration. One skilled in the art will appreciate that by inserting the first and second seat pockets 100*a*, 100*b* in the vertical flow bore 105, a size of the valve cavity 110 and the chamber 113 and a volume of grease in the valve cavity 110 and the chamber 113 may be reduced. Additionally, the first and second seat pockets 100*a*, 100*b* may be easily accessed to be removed for repairs or replacement.

Figure 4:
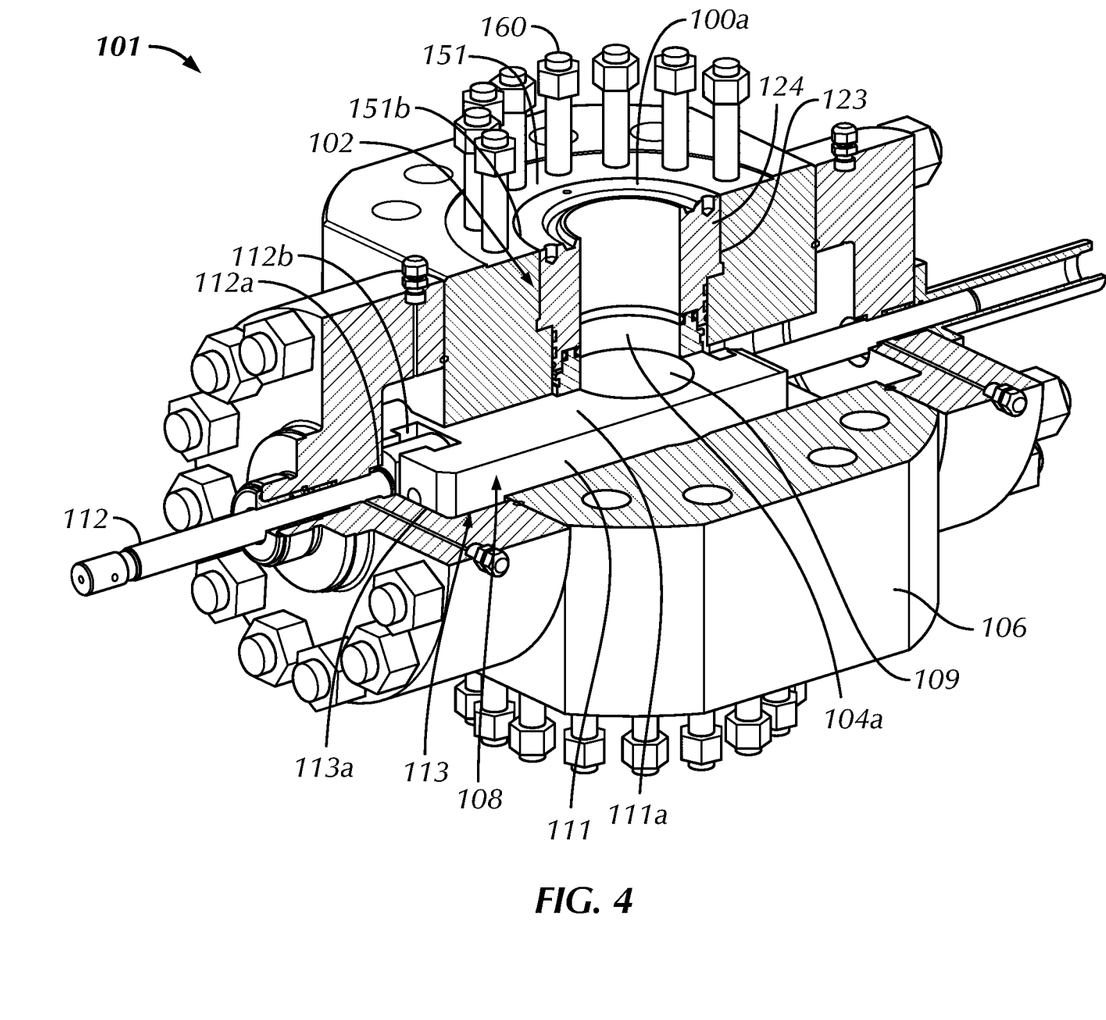
FIG. 4 is a perspective cross-sectional view of a seat pocket insert in accordance with one or more embodiments of the present disclosure.

FIG. 4 illustrates a perspective partial cross-sectional view of the valve block 101 with the first seat pocket insert 100*a* of FIG. 2 in accordance with one or more embodiments of the present disclosure. As shown in FIG. 4, the valve 108 is shown in the open position. In the open position, the valve opening 109 of the valve 108 may be aligned with the vertical flow bore 105 to allow flow through the body 106 of the valve block 101. Further, the top surface 111*a* of the valve body 111 may abut and force the first seats 104*a* against the first seat pocket inserts 100*a* It is further envisioned that the extensions rod 112 may have an end 112*a* connected in a cut-out 112*b* of the valve body 111 to actuate the valve 108. Furthermore, the valve body 111 may abut against an end 113*a* of the chamber 113 to have the valve 108 in a fully open position.

In one or more embodiments, the connection or contact surface 122 of the first seat pocket insert 100*a* is flush against the connection or contact surface 123 of the valve block 101. With the contact surfaces flush against each other, a flange 151 may be coupled to the valve body 106 to retain the first seat pocket insert 100*a* in the inlet 102. In a non-limiting example, threaded bolts 160 may be used to couple the flange 151 to the valve body 106. While it is noted that FIG. 4 shows eight threaded bolts 160, one of skill in the art would understand that this is merely a non-limiting example and any number of threaded bolts 160 may be used without departing from the present scope of the disclosure. Further, an inner surface 151*a* of the flange 151 may be abutted against a bevel 151*b* of the first seat pocket insert 100*a* to retain and lock the first seat pocket insert 100*a* within the inlet 102. Additionally, one skilled in the art will appreciate how a second flange may be used to retain and lock the second seat pocket insert (100*b*) within the outlet (103) similar to how the flange 151 retains and locks the first seat pocket insert 100*a* within the inlet 102.

Figure 5:
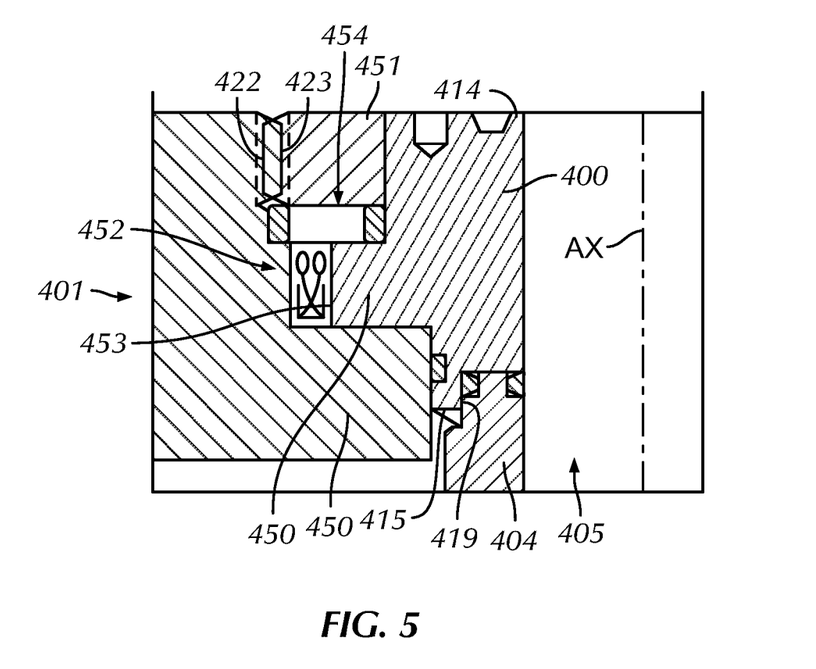
FIG. 5 is a cross-sectional view of the seat pocket insert in accordance with one or more embodiments of the present disclosure.

Referring to FIG. 5, in one or more embodiments, a cross-sectional view of a seat pocket insert 400 in a valve block 401 is illustrated. Additionally, the seat pocket insert 400 may be coaxially aligned with a seat 404 within a flow bore 405 of the valve block 401. Further, the seat pocket insert 400 and the seat 404 may be aligned with an axis AX of the flow bore 405. It is noted that the seat pocket insert 400 may have an axial protrusion similar to the seat pocket inserts (100 a, 100 b) described in FIGS. 1-4. The seat pocket insert 500 may include an insert body extending, in an axial length, between a first end surface 414 and a second end surface 415 formed at the end of the axial protrusion. Additionally, fluids may float the seat 404 to rest against a seat pocket 419 provided by the axial protrusion.

In a non-limiting example, the seat pocket insert 400 may have a projection 450 extending in a radial direction. The projection 450 may abut against a body 406 of the valve block (101) such that the seat pocket insert 400 sits within the flow bore 405. Further, in some embodiments, a flange 451 may be inserted above the projection 450 to retain the seat pocket insert 400 within the flow bore 405. In a non-limiting example, a connection surface 422 on an outer surface of the flange 451 may have threads that may engage threads of a connection surface 423 within the body 406 of the valve block 401. For example, the connection surface 423 may be provided on a portion (e.g., a flow passage or cavity) of the flow bore 405 such that the flange 451 may lock/retain the seat pocket insert 400 within the valve block 401. One skilled in the art will appreciate how the threads on the connection surfaces 422, 423 may be any type of threads, such as ACME threads, API threads, or specialty threads. While it is noted that FIG. 5 shows threads on the connection surfaces 422, 423 to make-up the flange 451 to the valve block 401, one of skill in the art would understand that the use of threads is merely a non-limiting example and any different type of mechanical coupler may be used without departing from the present scope of the disclosure to couple the flange 451 to the valve block 401.

Figure 6:
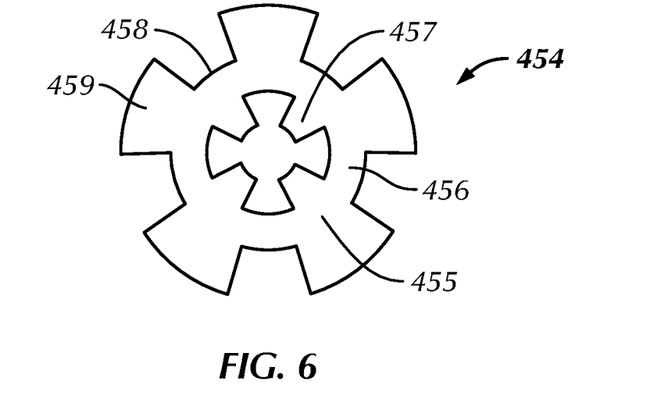
FIG. 6 is a top view of an anti-rotation device in accordance with one or more embodiments of the present disclosure.

In some embodiments, as illustrated in FIG. 5, a seal 452 may be provided at an end 453 of the projection 450 to create a metal-to-metal seal between the seat pocket insert 400 and the body 406 of the valve block. Additionally, grease may be provided in a cavity to keep the seal 452 lubricated. It is further envisioned that an anti-rotational device 454 is disposed between the seat pocket insert 400 and the body 406 of the valve block 101. In a non-limiting example, the anti-rotational device 454 may be retained within the flow bore 105 by the flange 451 locking the anti-rotational device 454 against the projection 450. As shown by FIG. 6, the anti-rotational device 454 may be a ring 455. The ring 445 may have an inner surface 456 provided with a plurality of inner protrusions 457 to engage the seat pocket insert 400. Additionally, the ring 445 may have an outer surface 458 provided with a plurality of outer protrusions 459 to engage the valve block 401. With the plurality of inner protrusions 457 engaging the seat pocket insert 400 and the plurality of outer protrusions 459 engaging the valve block 401, the seat pocket insert 400 may not rotate within the flow bore 405. While it is noted that FIG. 6 shows four inner protrusions 457 equally spaced apart and five outer protrusions 459 equally spaced apart, one of skill in the art would understand that this is merely a non-limiting example and any number of protrusions (457, 459) may be used without departing from the present scope of the disclosure.

Furthermore, methods of the present disclosure may include use of the seat pocket insert (100, 100*a*. 100*b*, 400) and other structures, such as in FIGS. 1-6 for sealing a seat within a valve block. Because the method may apply to any of the embodiments, reference numbers are not referenced to avoid confusion of the numbering between the different embodiments.

Initially, a first seat may be disposed into a flow bore of a valve block. In non-example, a first seat pocket insert may be inserted into an outlet or an inlet of the flow bore. Next, a connection or contact surface of the first seat pocket insert is coupling to a first connection or contact surface of the valve block. In a non-limiting example, threads are provided on the connection surfaces of the first seat pocket insert and the valve block. Further, the threads of the first seat pocket insert are threaded with the threads of the valve block. One skilled in the art will appreciate how the threading of the connections is aided by applying a force or torque, with a hammer or wrench (manually or hydraulic), to at least torque connection (e.g., a hole) in a first end surface of the first seat pocket insert. Additionally, the first seat pocket insert is torqued such that an outer shoulder of the first seat pocket insert abuts against a first ledge of a valve block. Further, a first seal may be provided to sealingly close any leak pathways between the first seat pocket insert and the valve block. Additionally, the first seat pocket insert may be retained and locked within the inlet or the outlet via a first flange coupled to the valve block. In a non-limiting example, an inner surface of the first flange may abut against a bevel of the first seat pocket insert and threaded bolts may bolt the first flange to the valve block. With the first seat pocket insert connected in the flow bore, the seat may sealingly engage against a profile of the first seat pocket insert. In a non-limiting example, the first seat may abut against the profile of the first seat pocket insert due to a pressure from a valve forcing the first seat towards the first seat pocket insert. Additionally, the profile may be machined to be a seat pocket and match a shape of the first seat. Further, the first seat may be flush against a surface of the profile and a shoulder extending from the profile may abut against a shoulder of the first seat. With the first seat against the first seat pocket insert, a first elastomer seal in a first groove of the first seat may be used to coaxially aligning a bore of the first seat with a bore of the first seat pocket insert in the flow bore of valve block. Additionally, a second seal may be provided to sealingly close any leak pathways between the first seat pocket insert and the first seat.

Additionally, a second seat may be inserted on a surface of the valve opposite the first seat. Next, a second seat pocket insert may be inserted into the outlet or the inlet of the flow bore opposite the pocket insert. Next, a connection or contact surface of the second seat pocket insert is connected to a second connection or contact surface of the valve block. In a non-limiting example, threads are provided on the connection surfaces of the second seat pocket insert and the valve block. Further, the threads of the second seat pocket insert are threaded with the threads of the valve block. One skilled in the art will appreciate how the threading of the connections is aided by applying a force or torque, with a hammer or wrench (manually or hydraulic), to at least torque connection (e.g., a hole) in a first end surface of the second seat pocket insert. Additionally, the second seat pocket insert is torqued such that an outer shoulder of the second seat pocket insert abuts against a second ledge of a valve block. Further, a third seal may be provided to sealingly close any leak pathways between the second seat pocket insert and the valve block. Additionally, the second seat pocket insert may be retained and locked within the inlet or the outlet via a second flange coupled to the valve block. In a non-limiting example, an inner surface of the second flange may abut against a bevel of the second seat pocket insert and threaded bolts may bolt the second flange to the valve block. With the second seat pocket insert connected in the flow bore, the second seat may sealingly engage against a profile in a second end surface of the second seat pocket insert. A pressure from the valve may abut the second seal against the second seat pocket insert. The profile of the second seat pocket insert may be machined to be a seat pocket and match a shape of the seat. In a non-limiting example, the second seat may be flush against a surface of the profile of the second seat pocket insert and a shoulder extending from said profile may abut against a shoulder of the seat. Additionally, a second elastomer seal in a second groove of the second seat may be used to coaxially aligning a bore of the second seat with a bore of the second seat pocket insert in the flow bore of valve block. Additionally, a fourth seal may be provided to sealingly close any leak pathways between the second seat pocket insert and the second seat. With the second seat pocket insert installed, the second seat may be held in place by the second seat pocket insert and valve body, while the first seat may be held in place by the first seat pocket insert and the valve body. One skilled in the art will appreciate how the first seat pocket insert, the second seat pocket insert, the first seat, and the second seat may be coaxially aligned with the flow bore of the valve block.

Furthermore, a first anti-rotation device may be disposed between the first seat pocket insert and the valve block. In addition, a plurality of protrusions on an inner surface of the first anti-rotation device engages the first seat pocket insert and a plurality of protrusions on an outer surface of the first anti-rotation device engages the valve block. Further, a second anti-rotation device may be disposed between the second seat pocket insert and valve block in the same manner as the first anti-rotation device engages the first seat pocket insert and valve block. The first and second anti-rotation devices may aid in holding the first and second seat pocket insert in place within the flow bore of the valve block. With the first and second seat pocket inserts installed in the valve block holding the first and second seats, the valve extending within the valve block, such as a gate valve, may be opened and closed. In a non-limiting example, in order to open the valve, an extension rod contacting a valve body is actuated. A wheel or actuating device attached to the extension rod may be actuated to pull the valve body from the bore of the valve block to abut an end of a chamber within the valve block. Further, a valve opening moves from a valve cavity within the valve block to coaxially align with the bore of the first and second seat to place the valve in an open position. In order to close the valve, the wheel or actuating device attached to the extension rod may be actuated in an opposite direction to push the gate opening back into the valve cavity. Additionally, the valve body extends back through and abuts an end of the valve cavity to have a body of the valve block the bores of the first and second seats to have the valve in a closed position. It is further envisioned that the first and/or second seat pocket insert may be decoupled from the valve block at any time for repairs or replacement to any component.

Conventional valve blocks in the oil and gas industry are typically very large and heavy. Conventional valve blocks may include a flow bore with a seat pocket machined within the flow bore. Such valve blocks may be both heavier in weight and may also be more expensive to manufacture because of the additional machining Additionally, due to fluids flowing in the flow bore, both the flow bore and seat pocket experience erosion from the fluids. Further, the erosion is significantly increased with the seat is sealed in the seat pocket machined in the valve block. This additional erosion to the flow bore and seat pocket may cause failures or needs to undergo complicated and costly welding operations to the weight to repair the flow bore and seat pocket. Theses complicated and costly welding operations increase downtime of the well as well as the overall cost of valve blocks. Further, the conventional valve blocks may be connected to other subsea components and achieving a successful tie-in and connection valve blocks is an important part of a subsea field development. Additional challenges further exist in a conventional valve blocks for connection from one structure to another while both minimizing costs and providing flexibility for future changes to the overall layout of a field or well.

Accordingly, one or more embodiments in the present disclosure may be used to overcome such challenges as well as provide additional advantages over conventional valve blocks, as will be apparent to one of ordinary skill. In one or more embodiments, a seat pocket insert may be lower in cost as compared with conventional valve blocks due, in part, to not needing a seat pocket machined into the flow bore. easily swap out the worn pieces Additionally, the seat pocket insert may allow for easy repair as the worn pieces may be easily swapped out thus requiring no welding, relaxing control tolerances, improving manufacture (i.e. reduced cost and reduced time to manufacture), and complicated repair operations. Furthermore, using the seat pocket insert may allow installation of seats through a side of the valve block rather than through the gate cavity, such that valve block may minimize a size of gate cavity and a volume of expensive grease that must fill that cavity during use. Overall the seat pocket insert may minimize product engineering, risk associated with valve block manufacture, reduction of assembly time, hardware cost reduction, repair cost, and weight and envelope reduction.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method comprising:
    disposing a first seat in a flow bore of a valve block;
    inserting a first seat pocket insert into an outlet or an inlet of the flow bore, wherein the first seat pocket insert comprises;
        an insert body extending, in an axial length, between a first end surface and a second end surface, the insert body comprising:
            an inner diameter defining a bore extending axially through the insert body along the axial length of the insert body;
            an axial protrusion, comprising:
                the second end surface at an end of the axial protrusion, and
                a protrusion inner surface defining a protrusion inner diameter greater than the inner diameter of the bore; and
            a seat pocket having a profile defined by the protrusion inner surface and a protrusion shoulder surface;
    aligning the first end surface to be flush with an outer surface of the valve block; and
    using a pressure from a valve to sealingly engage the first seat against the profile of the seat pocket and abut the second end surface of the axial protrusion against a shoulder of the first seat.

2. The method of claim 1, further comprising coaxially aligning a bore of the first seat and the bore of the first seat pocket insert with a first seal.

3. The method of claim 2, further comprising inserting a second seat and a second seat pocket insert into the outlet or the inlet of the flow bore opposite the first seat pocket insert, and sealingly engaging the second seat against a second pocket seat profile of the second seat pocket insert via the pressure from the valve.

4. The method of claim 3, further comprising coupling a connection surface of the first seat pocket insert to a first connection surface of the valve block and coupling a connection surface of the second seat pocket insert to a second connection surface of the valve block.

5. The method of claim 4, further comprising locking the first seat pocket insert in the valve block with a first flange coupled to the valve block and locking the second seat pocket insert in the valve block with a second flange coupled to the valve block.

6. The method of claim 4, wherein the coupling of the first seat pocket insert and the second seat pocket insert comprises applying torque to at least one torque connection in a surface of the first seat pocket insert and the second seat pocket insert.

7. The method of claim 3, further comprising coaxially aligning a bore of the second seat pocket insert and the bore of the second seat with a second seal.

8. An assembly comprising:
    a seat pocket insert for a valve block and a valve seat, the seat pocket insert comprising:
        an insert body extending, in an axial length, between a first end surface and a second end surface, the insert body comprising:
            an inner diameter defining a bore extending axially through the insert body along the axial length of the insert body;
            an axial protrusion, comprising:
                the second end surface at an end of the axial protrusion, and
                a protrusion inner surface defining a protrusion inner diameter greater than the inner diameter of the bore; and
            a seat pocket having a profile defined by the protrusion inner surface and a protrusion shoulder surface;
    wherein the first end surface is flush with an outer surface of the valve block,
    wherein the second end surface sealingly engages with the valve seat, and
    wherein the protrusion shoulder surface abuts a shoulder of the valve seat.

9. The seat pocket insert of claim 8, wherein the insert body comprises a first portion proximate the first end surface and a second portion proximate the second end surface, the first end surface being opposite the second end surface, and the first portion comprising a connection surface on an outer surface of the insert body.

10. The seat pocket insert of claim 9, wherein an outer diameter of the first portion is larger than an outer diameter of the second portion to form an outer load shoulder of the insert body.

11. The seat pocket insert of claim 9, further comprising a metal-to-metal seal disposed on the second portion and between the insert body and the valve block.

12. The seat pocket insert of claim 8, wherein the first end surface comprises at least a torque connection.

13. The seat pocket insert of claim 8, further comprising a connection surface provided on an outer surface of the insert body.

14. The seat pocket insert of claim 8, wherein the insert body is a single piece.

15. A valve block, comprising:
- a body having one or more flow bores;
- at least one seat having a bore, the at least one seat being disposed within the one or more flow bores; and
- at least one seat pocket insert inserted to an outlet or an inlet of the one or more flow bores, wherein each of the at least one seat pocket insert comprises:
  - an insert body extending, in an axial length, between a first end surface and a second end surface, the insert body comprising:
    - an inner diameter defining a bore extending axially through the insert body along the axial length of the insert body;
    - an axial protrusion, comprising:
      - the second end surface at an end of the axial protrusion, and
      - a protrusion inner surface defining a protrusion inner diameter greater than the inner diameter of the bore; and
    - a seat pocket having a profile defined by the protrusion inner surface and a protrusion shoulder surface;
  - wherein the protrusion shoulder surface abuts a shoulder of the at least one seat;
  - wherein the second end surface sealingly engages with the at least one seat, and
  - wherein the first end surface is flush with an outer surface of the valve block.

16. The valve block of claim 15, further comprising a flange coupled to the body configured to lock the at least one seat pocket insert within the outlet or the inlet.

17. The valve block of claim 16, wherein the at least one seat pocket insert comprises a connection surface provided on an outer surface of the insert body, wherein the connection surface of the at least one seat pocket insert is coupled to a connection surface of the body.

18. The valve block of claim 17, wherein the connection surface of the body is an inner surface of a cavity at the outlet or the inlet of the one or more flow bores, and wherein the connection surface of the at least one seat pocket insert and the connection surface of the body are threaded.

19. The valve block of claim 15, further comprising a valve disposed in a chamber of the body and wherein a body of the valve abuts against the at least one seat.

20. The valve block of claim 15, wherein the one or more flow bores, the bore of the at least one seat, and the bore of the at least one seat pocket insert are coaxial.

21. The valve block of claim 20, further comprising a seal disposed between the at least one seat pocket insert and the at least one seat.

22. The valve block of claim 15, wherein a first seat pocket insert of the at least one seat pocket insert is inserted in the outlet of the one or more flow bores and a second seat pocket insert of the at least one seat pocket insert is inserted in the inlet of the one or more flow bores.

23. The valve block of claim 22, wherein a first seat of the at least one seat is between the first seat pocket insert and a body of a valve, and a second seat of the at least one seat is between the second seat pocket insert and the body of the valve.

24. The valve block of claim 15, further comprising an anti-rotation device disposed between the at least one seat pocket insert and the body of the valve block.

\* \* \* \* \*